May 26, 1942.  E. O. MEYER  2,284,335
POLYSTYRENE PRODUCT
Filed July 24, 1940
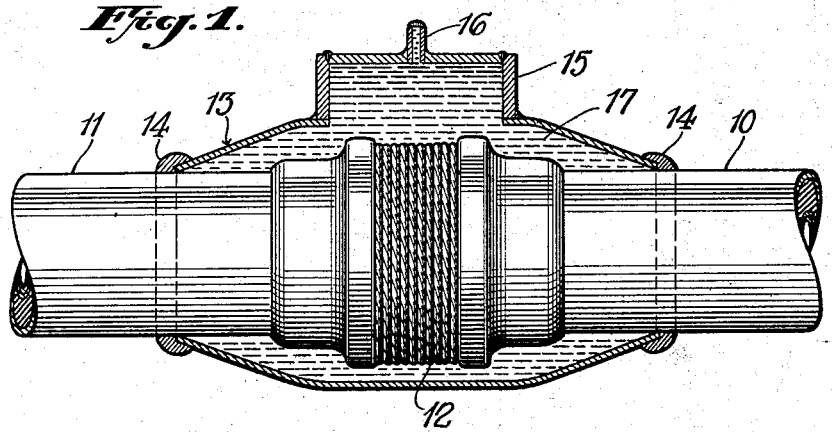
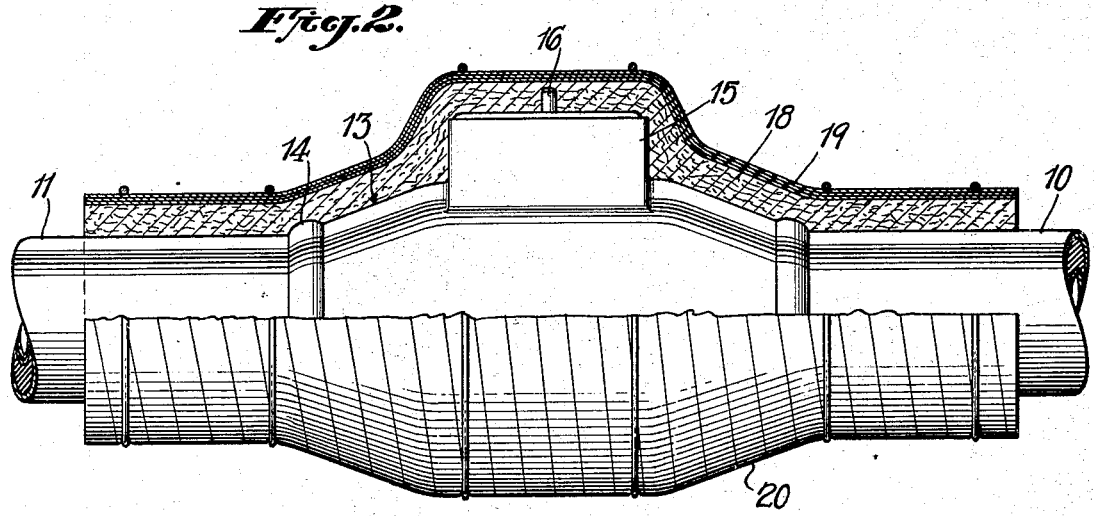
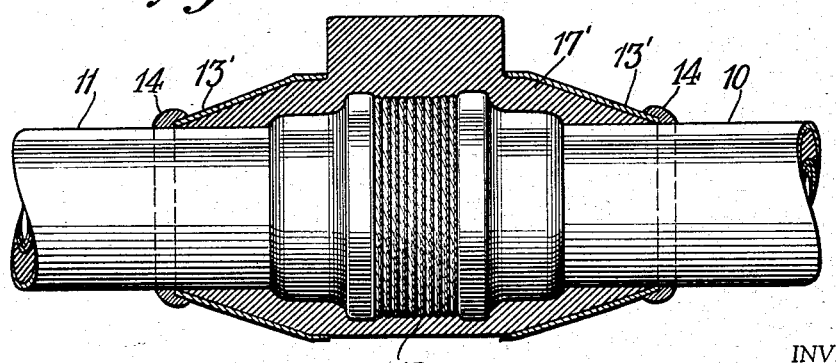
INVENTOR.
ERICH O. MEYER.
BY Ward, Crosby & Neal
ATTORNEYS Patented May 26, 1942

2,284,335

UNITED STATES PATENT OFFICE 2,284,335

POLYSTYRENE PRODUCT

Erich O. Meyer, Teaneck, N. J., assignor to Consolidated Edison Company of New York, Inc., New York, N. Y., a corporation of New York Application July 24, 1940, Serial No. 347,173

7 Claims. (Cl. 260—36)

This invention relates to improved styrene compositions and more particularly to polymerized polystyrene plastic compositions and methods of making and using same, in types suitable for example as electrical insulating material for cable sheath joints and similar purposes.

In accordance with an important phase of the invention a styrene composition may be prepared which is especially suitable for the above mentioned electrical purposes, by combining preferably a partially polymerized liquid styrene with relatively small amounts of certain accelerators and plasticizers, and gradually polymerizing the styrene by treatment at relatively low heating temperatures. This treatment carries the styrene through a series of distinct changes and finally converts it into a uniformly hard, tough substantially transparent plastic which has extremely high breaking strength, and tenacity when formed in contact with the metallic sheaths of electrical cables. Also the product has highly desirable electrical insulating characteristics, such as a very low dielectric power factor, and is highly resistant to moisture, oxygen, weak acids and alkalis, and to oils of types used in oil-filled cables.

The physical properties of the polymerized styrene composition may be changed substantially by variations in the processing conditions. If the styrene is polymerized rapidly by using a relatively larger amount of accelerator, or utilizing relatively higher temperatures, the final hardened product will be brittle and have numerous voids caused by air bubbles which are sealed in the plastic mass. Such higher temperatures if used to polymerize the mass in the presence of electrical cables may also damage the cable insulation materials. The other extreme from these conditions is to permit the styrene to polymerize by itself without heating and without the use of accelerators, but this generally requires too long a time to be practical in commercial use. In the preferred procedure according to this invention, the styrene is combined with an amount of accelerator, preferably not exceeding about 0.5%, which is sufficient to reduce the polymerization time to a commercially feasible period ranging from about 10 days to about 40 or 50 days at temperatures conveniently obtainable on electrical cables, and at the same time not producing any voids or bubbles in the final product. With such slow polymerization, any air bubbles that are formed have time to rise and escape from the top of the mass while the styrene is still in the liquid or semi-liquid stage, thereby avoiding trapping of such air bubbles in the final hardened product. The accelerators which may be used for shortening the polymerization time of the styrene include peroxides, such as for example benzoyl peroxide, acetyl peroxide, hydrogen peroxide, ascaridole, and ozonites; and also the use of ultra violet rays. The ultra violet rays apparently produce an auto-catalyst in the styrene which accelerates polymerization. The amount of chemical accelerator, such as the ozonites and peroxides preferably used, may vary from about 0.1% to 0.5%. While larger amounts than 0.5% may be used with proportional decrease in polymerization time, they have the disadvantage of tending to cause the final product to be brittle, and, therefore, it is preferred not to use more than about 0.5%.

To eliminate cracking or checking of the plastic product, due to stresses and strains normally set up in these plastics upon cooling and ageing, and to increase the toughness of the product, a small amount of a plasticizer is preferably incorporated in the styrene composition. The amount used is controlled so that the final product will have the desired strength and hardness characteristics, and will also be substantially transparent, that is, the amount of plasticizer used, although small, is sufficient to eliminate the milk white color which often forms in these plastics.

In connection with the plasticizer I have discovered a quite unexpected effect obtained in the polymerization of the styrene by the use of a relatively very small amount of dibutylphthalate as the plasticizer. Such a plasticizer during the earlier stages of the polymerization first tends to soften the polymerized styrene product, but entirely contrary to the expected effect of such a plasticizer I find that after the initial softening action, the dibutylphthalate, if in quite small amounts, then functions in the reverse manner to accelerate or increase the hardening of the plastic, and consequently producing a harder final product than is obtained under the same conditions without the use of dibutylphthalate. Yet this harder product is extremely tough and does not crack under severe or repeated blows with a hammer. It is thus seen that the dibutylphthalate performs the dual function of a plasticizer and subsequently of a hardening agent when used in this relatively very small amount and in accordance with other processing steps of the invention.

Examples of plasticizers which may be used for making the product of my invention are: Dibutylphthalate, carbitolphthalate, butyl stearate, rubber-hard cumar, tricresyl phosphate, triethyl phosphate.

In most cases the amount of one or more of the above plasticizers used in the composition will range between about 0.5% and 2%. A commercially advantageous range for preparing the plastic for electrical insulating purposes is between about 0.5% and 1%.

A typical but non-limiting example of the composition of the invention and the method of manufacture thereof is as follows:

Composition

| | Per cent |
|---|---|
| Styrene | 99 |
| Dibutylphthalate | 0.5 |
| Benzoyl peroxide | 0.5 |
| | 100 |

To prepare a solid polymerized product from the above composition, the three constituents may be mixed simultaneously and heated over a period of time until the desired hardness of the product is obtained. However, it has been found advantageous and in fact important in preparing a product which will have all the above mentioned desirable characteristics for electrical insulating purposes, such as for cable sheath joints, to follow the following procedure. According to this preferred process the styrene is first prepolymerized, that is, partially polymerized by heating the liquid monostyrene at its boiling point, i. e., about 145° C. for a length of time such that this heat treatment causes the density of the liquid monostyrene to change from an original value of about 0.906 to a value preferably about 0.969, or between about 0.960 and 0.980. The time necessary for such heat treatment may be determined by trial tests of the specific gravity, and may require for example one hour or a considerably shorter time depending upon the amount of heat applied and the quantity treated. This change in specific gravity results in a syrup-like liquid which may still be easily poured into a mold. A considerable amount of the styrene, probably about 40%, will have been converted to a polymer form.

After this prepolymerizing treatment the solution is cooled to room temperature and the accelerator, such as benzoyl peroxide in the form of a dry powder is incorporated in the styrene liquid. The dibutylphthalate plasticizer is also added and the three constituents are thoroughly mixed. The accelerator as added should preferably be in the form of a dry powder, since its addition in the form of a solution is undesirable in view of the fact that if the material is finally to be cured in a sealed mold, any solvent could not escape but would interfere with the hardening of the plastic. The use of the plasticizer as a solvent for the accelerator was found to be undesirable because the benzoyl peroxide would be only partially soluble in the amount of dibutylphthalate above specified.

The time required for effecting final polymerization into the hard, tough product depends not only upon the amount of accelerator present as discussed above, but also upon the temperature now employed for completing the polymerization. It is of definite advantage for the purposes of this invention to maintain the temperature at a relatively low value, such as for example about 30° C. to about 40 or 50° C., so as to produce a slow gradual polymerization, resulting in a final product desirably free of brittleness and other mechanical faults and exceedingly tough and hard. This temperature of about 30° C.–50° C. may be applied in any desired manner and it will be found that the composition which is originally in liquid form will remain as a liquid without any easily recognizable change in viscosity for a period of a few days. After this period the viscosity of the liquid steadily increases for several days. During the second stage of the polymerization, the viscous liquid composition is converted progressively into a soft gel. It is desirable to have the composition freed of at least most of the air bubbles before the gel stage progresses very far, so as to prevent trapping of the air bubbles in the gel.

The converted gel being heavier than the original liquid, settles at the bottom of the container or the device in which the composition is heated, leaving the less converted portion of the composition as a supernatant liquid. The third stage of the curing or polymerization takes place during an additional period of several days when the soft gel is converted gradually into a semi-hard plastic gel. The fourth and final polymerization stage which requires another period of several days transforms the rubbery gel into a hard and tough plastic mass.

In addition to carrying out the polymerization at a relatively low temperature, such as 30 to 50° C., it has been found that this relatively low temperature treatment can be effected in situ when the plastic is to be used as an electrical insulating material, such as for insulation joints between sections of cable sheaths or for other forms of conductor joints, terminals and the like purposes. Many electrical power cables while in use operate normally at a temperature within this range, and at maximum temperatures generally considerably less than 70° C. Accordingly the cable operating temperatures may be utilized very effectively for polymerizing the prepolymerized styrene, by depositing the composition in a mold enclosing the cable sheath joint and heated by the inherent operating temperature of the cable. The same heating method may be used even though at times the temperature may fall to about 15° C., for example when the current is cut off, or even if the cable is seriously overloaded at times so as to have temperatures up to 70° C. for example.

A practical example of a mold arrangement for the use of the invention in connection with the sealing and insulation of cable sheath joints, is shown in the accompanying drawing, in which Fig. 1 is a sectional view of a cable sheath joint and surrounding mold;

Fig. 2 is a side elevation of the mold as of Fig. 1 and showing the use of temporary heat insulating material around the mold; and Fig. 3 is a plan view showing the finished insulating joint, after removal of the main body portion of the mold.

In the figures, two lead cable sheath sections are indicated at 10 and 11. In case the cable is filled with oil, and particularly if the oil is under substantial pressure, the space separating the two sheath sections is first wound and treated with wrappings of suitable insulating and adhesive material to form a joint as indicated at 12, which will be substantially oil-tight at least over a period of time sufficient to permit the styrene composition to be applied and hardened. A preferred manner of forming an oil seal such as at 12 is disclosed and claimed in the copending application of Ward F. Davidson and Earl R. Thomas, Ser. No. 347,168, filed on even date herewith (Patent No. 2,256,897), and entitled "Insulating joint for electric cable sheaths and method of making same."

After the oil seal 12 has been applied, the region at the ends of the two adjacent cable sheath sections may be enclosed in a mold as at 13 formed of sheet lead or else lined with lead or tin. With these metals it has been found that there is substantially no interaction with the prepolymerized styrene composition above specified, whereas if the mold parts or fittings included any metals such as copper or brass, some segregation of the plasticizer, accelerator, monostyrene and polystyrene may take place, apparently due to the reaction between the catalyst and brass or copper, forming copper or zinc benzoates which retard the curing.

If the mold parts are made of lead, the joints in the mold may be sealed by solder or by lead burning and the ends of the molds may be sealed to the cable sheath sections 10 and 11 as by "wiped" solder joints 14.

During the polymerization of the styrene composition the mass undergoes a substantial shrinkage which may amount for example, to 10% and accordingly to compensate for this shrinkage, a reservoir as at 15 is preferably formed at the top of the mold so that even after shrinkage of the composition, the main body portion of the mold at least will still be filled.

After the mold parts and reservoir 15 are complete on the joint, the syrup-like styrene composition above specified may be poured into the mold as indicated at 17, after which a cover may be soldered on to the reservoir 15 as shown, having a filling spout 16 permitting final complete filling of the reservoir. During the curing period the filling spout may be sealed as by solder.

In order to avoid pockets of entrapped air in the mold, it should preferably be so shaped that air will be free to rise up through the liquid to the top of the reservoir from all parts of the mold. To this end the mold has its ends preferably tapered in the manner shown.

After the mold has been sealed, if the heat of the cable in normal use is to be relied on to accomplish the polymerization, the region of the joint is preferably wrapped with heat insulating material. This may comprise for example a layer of wool about 1 inch thick, as at 18, two layers of asbestos listing as at 19, and an outer layer for example of paraffin cotton tape as at 20, all secured in place as by spaced wire bands as shown. Other suitable insulation materials may also be used, such as for example a winding of string covered with a layer of aluminum foil followed by layers of cheese cloth, asbestos tape and paraffin cotton tape. The proper amount and character of the insulation may be readily determined by trial and depends upon the polymerizing temperature range desired, the resistance of the cable and the amount of current normally carried thereby in use.

With the cable joint as shown wrapped in Fig. 2 on an electric power cable in use with a normal load, and with the preferred polymerized styrene mixture above specified, a temperature of about 35–38° C. may be readily maintained in the mixture, and the mixture will become both hard and tough within about 14 days. In about 40 days or thereabouts, for example, the heat insulation material may be safely removed and the resulting mass will have a mechanical strength as shown by transverse bending tests equivalent to the maximum generally obtainable in plastic compositions. Finally a substantial part of the central portion of the mold, together with the reservoir 15 should be cut away so as to leave for example a finished insulating joint as shown in Fig. 3. As here shown, only the outer ends of the mold or sleeve 13 may be left as at 13', and these will form annular bands sealed at their outer edges by the solder wipes to the cable sheath, and covering and protecting the thin edges of the plastic mass 17'.

During the curing process in the mold arrangement as above described, the pressure within the reservoir 15 will be very nearly atmospheric. While the shrinkage of the composition tends to reduce the pressure in the mold to somewhat below atmospheric pressure, yet this tendency is largely compensated for by reason of the fact that the composition will contain some dissolved air and during the polymerization this air will be driven off in the form of bubbles which rise to the surface of the liquid. Tests indicate that variations of the pressure within the mold to points somewhat above or below atmospheric pressure, are neither detrimental nor beneficial.

The resulting hard plastic mass 17' will have a specific gravity of about 1.05 and will be substantially free of bubbles and so firmly bonded to the cable sheath that any force tending to pull apart the cable sections will ordinarily tear the lead sheath about as soon as, or before the plastic joint gives way or parts from the cable sheath. Such firm bonding of the insulation to the cable sheath is not only important from the mechanical standpoint, but also insures that there will be no leakage of oil from the cable even after long periods of time and with high oil pressures of for example 40 lbs. per square inch. The firm bond to the lead cable sheath is apparently not only due to the inherent tenacity of the plastic as polymerized in situ on metals such as lead or tin, but also enhanced considerably by the gradual shrinkage of the mass into close embrace of the cable during the slow hardening.

The resulting plastic mass is substantially transparent and thus the condition of the preliminary oil seal at 12 may be easily inspected at any time if desired and any imperfections in the joint or its bond to the cable sheaths will be apparent.

When the mold is first removed, the surface of the plastic, except for the top area, may be slightly translucent or milky due possibly to a very slight effect of the lead on the styrene while still only partially polymerized, but the clear transparent mass may be easily revealed by rubbing the surface with a small amount of a suitable polystyrene solvent such as toluene.

With this form of joint insulation, sudden wide changes of temperature as from −70° C. up to +60° C. have no apparent effect on the polystyrene mass, and the same may be subjected to temperatures up to about 100° C. at least, without recognizable softening. The resistance of typical joints made according to the above described methods is very high, for example from 600 to 800 megohms.

The use of heat insulation such as shown in Fig. 2 for example for completely surrounding the joint and mold, not only insures retention of sufficient heat from the heat of the current-carrying cable to give the desired polymerizing temperature, but also prevents the outer portions of the plastic from being subjected to temperature changes due to changing weather conditions and insures that all portions of the plastic mass will be heated substantially uniformly and thus thoroughly and uniformly polymerized during the predetermined curing period.

It is preferable that the reservoir portion 15 of the mold be included within the heat insulation enclosure. Otherwise during the curing period the heavier polymers would settle on the bottom of the mold and the monostyrene would accumulate at the top in the reservoir and the presence of the liquid monostyrene in the cold reservoir would have a cooling and dissolving effect on the partially polymerized plastic mass at the top of the mold.

The use of styrene which has been prepolymerized before it is poured into the molds, has a number of advantages. It is an important factor in shortening the actual time required to obtain a completely polymerized cast on the cable sheath. That is, a substantial part of the polymerizing action may be quickly accomplished at the boiling temperature, before bringing the styrene into the presence of the cable. Furthermore, it appears that styrene or polystyrene— benzoyl peroxide mixtures have a critical temperature at which the polymerization action becomes so exothermic and vigorous that the solution boils and foams. This is caused by a pronounced development of gas in the liquid. The possibility of the occurrence of such foaming in the molds may be avoided by using the prepolymerized mixture above specified with the mold temperatures above specified. It has also been observed that monostyrene has a detrimental effect on various organic materials such as used in making the oil seal at the joint as at 12. However, by using the prepolymerized styrene, materials may be more readily selected for the oil seal, and for the mold, as to which the polymer is substantially inactive. Also by prepolymerizing the styrene, especially when following this by a long period of slow curing at relatively low temperatures, a product substantially free from bubbles is assured. That is, gases evolved during the prepolymerization at boiling temperatures have an opportunity to escape before the liquid is poured in the molds and gases formed during the curing of the material in the molds, have opportunity to rise to the top of the mold while the slowly cured mass is still liquid.

The above described prepolymerized styrene mixture with the accelerator and plasticizer should preferably be maintained at a temperature of no more than 2° C. during its storage and transportation and it is recommended that the mixture shall not be stored for more than 7 days prior to its use, or stored at temperatures less than 2° during this period. Such mixture should preferably be kept in a tin coated container or other suitable receptacle which will not interact with or otherwise alter the properties of the material. Filling of the molds should preferably not be done in the presence of high humidity or low temperatures. The molds should be capable of excluding moisture during the curing action.

For uses where a somewhat brittle product may not be objectionable, larger amounts of the accelerator and higher temperatures during the curing periods may be used so as to greatly reduce the time of treatment. For example, it is found that by using 3% benzoyl peroxide in a composition containing styrene prepolymerized as above specified, a hard plastic could be obtained by curing at 55° C. for a period of about 20 hours.

Under some circumstances satisfactory elimination of gas bubbles in the finished product may be accomplished even though a long curing time is not used, by the step of subjecting the mass to a pressure substantially below atmospheric, at least during the earlier stages of the curing period. For example, a clear plastic was obtained when the composition embodying 1% benzoyl peroxide was subjected to a partial vacuum for a period of 5 hours at a temperature of 60° C. followed by further treatment at atmospheric pressure at the same temperature for 45 hours. However, loss of styrene due to evaporation was relatively large and appeared to increase linearly with the amount of catalyst in the mixture. If the same treatment is applied to the same composition except for larger amounts of the benzoyl peroxide, the resulting product is found to be swollen and includes many gas bubbles.

The complete polymerization of a plastic material in a closed container which prevents the material from coming into contact with air and moisture appears very important for obtaining a clear and transparent product. For example, if during certain stages of the polymerization, the mixture comes in contact with water, a precipitate is formed which is white, gummy, and has the appearance of silk. The water appears to act as an accelerator forming polymers of short chain lengths. And in cases where the plastic is incompletely polymerized, it is observed that samples which were perfectly clear and transparent at the end of the curing process, become milky at their surfaces upon exposure to air for a number of days.

Materials which may be used for forming the preliminary oil seal such as at 12, or for similar uses in other forms of joints, etc., may include for example silk tape, so-called G. E. Glyptal tape and G. E. Glyptal cement No. 1276, which materials are not soluble in the prepolymerized styrene, although partially soluble in monostyrene.

In some cases it may be found possible to use molds made of steel, inasmuch as samples of steel were found not to be corroded when placed in the composition made with the prepolymerized styrene. However, it is noted that steel is corroded by the composition made with benzoyl peroxide if the styrene is not prepolymerized. The polystyrene appears to hinder the free action of the peroxide on metal.

If any great amount of oil such as used in cables becomes mixed with the styrene composition during or prior to its polymerization, such oil will act as a plasticizer and considerably retard the polymerization, although even amounts of such oil (so-called G. E. oil No. 5314) up to 15% will still allow the mixture to become hard after a number of months.

In cases where all of the factors of hardness, toughness and transparency are not important, various plasticizers other than those above specified may be used, such as about 2 to 5% of camphor, ethylacetanilide or butyl-cellosolve, with all of which clear, transparent plastics may be obtained although not generally so hard and strong as with the above specified preferred composition. With the higher amounts, such as 5% butylcellosolve, the plastic was cloudy. Vinylite resin and so-called Vistanex 3000, as plasticizers in the composition, gave products which were relatively softer than with the preferred composition and tending to be milky and having some gas bubbles. 5% of butylstearate as a plasticizer in the composition produced a clear, transparent plastic, but which was quite soft. With 2% of octylacetate as a plasticizer, the product was transparent and quite soft, but had some gas bubbles. With 2% resin the product was transparent and clear, but quite soft. With 2% Vinyloid H the product was milky, having some gas bubbles and soft. With from 2 to 5% of heavy solvent oil as the plasticizer, a fairly hard and strong, transparent, clear plastic was obtained. With from 2 to 5% of so-called RS or RH cumar resins, and with so-called cumar P10 and P25, fairly hard, strong, transparent, clear products were obtainable with a curing temperature of 40° C. for 26 days.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. A composition of matter for forming a polymerized plastic suitable for use as an electrical insulating material, comprising an intimate mixture of styrene, not more than about 0.5% of benzoyl peroxide polymerization accelerator and not more than about 2% of dibutylphthalate which functions first as a plasticizer and then to harden the composition.

2. A composition of matter for forming a polymerized plastic suitable for use as an electrical insulating material, comprising an intimate mixture of styrene, a small percentage of a peroxide polymerization accelerator and not more than about 2% of an organic plasticizer which functions first as a plasticizer and then to harden the composition.

3. A composition of matter for forming a polymerized plastic suitable for use as an electrical insulating material, comprising an intimate mixture of styrene, about 0.1% to 0.5% of a peroxide polymerization accelerator and about 0.5% to 2% of dibutylphathalate plasticizer which functions first as a plasticizer and then to harden the composition.

4. A composition comprising partially polymerized styrene and about 2% or less of dibutylphthalate which at first acts as a plasticizer and then hardens the composition upon subsequent further polymerization of the styrene.

5. An electrical insulating composition comprising polymerized polystyrene having a specific gravity of at least about 1.05, not more than about 0.5% of a peroxide accelerator and not more than about 2% of plasticizer that subsequently hardens the polystyrene during polymerization.

6. A method of preparing a polymerized polystyrene composition suitable for use as an electrical insulator, comprising intimately mixing with styrene not more than about 0.5% of a peroxide polymerization accelerator and not more than about 2% of a plasticizer that subsequently hardens the styrene, and heating the composition to temperatures between about 15° C.–70° C. for at least many days to effect a gradual polymerization of the styrene and until a hard tough product is obtained.

7. A method of producing a thermoplastic polystyrene material comprising partially polymerizing styrene by heating, incorporating about 2% or less of dibutylphthalate and heating slowly at temperatures between about 15° C. and 70° C. over a period of days to further polymerize the styrene into a hard tough material, said slow heating permitting any air bubbles to rise out of the heated material before solidification.

ERICH O. MEYER.